(12) United States Patent
Lobban et al.

(10) Patent No.: US 12,437,273 B2
(45) Date of Patent: Oct. 7, 2025

(54) SYSTEMS AND METHODS FOR TOKENIZING MONEY MARKET FUND SHARES FOR USE AS COLLATERAL OR IN OTHER TRANSACTIONS

(71) Applicant: JPMORGAN CHASE BANK, N.A., New York, NY (US)

(72) Inventors: Tyrone Lobban, London (GB); Nikhil Sharma, Hong Kong (CN); Leonard Joseph Sutton, Castletroy (IE); Lorraine Dunbar, Dublin (IE); Diane Macfarlane, Kingston (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 119 days.

(21) Appl. No.: 17/643,155

(22) Filed: Dec. 7, 2021

(65) Prior Publication Data

US 2022/0180331 A1    Jun. 9, 2022

Related U.S. Application Data

(60) Provisional application No. 63/122,852, filed on Dec. 8, 2020.

(51) Int. Cl.
*G06Q 20/02* (2012.01)
*G06Q 20/38* (2012.01)
*G06Q 40/04* (2012.01)

(52) U.S. Cl.
CPC ......... *G06Q 20/027* (2013.01); *G06Q 20/389* (2013.01); *G06Q 40/04* (2013.01)

(58) Field of Classification Search
None
See application file for complete search history.

(56) References Cited

U.S. PATENT DOCUMENTS

| | | | | |
|---|---|---|---|---|
| 2011/0270733 A1* | 11/2011 | Chazen | ............... | G06Q 40/04 705/37 |
| 2019/0340946 A1* | 11/2019 | Elmessiry | ............... | G09B 5/12 |
| 2019/0378130 A1* | 12/2019 | Heyner | ............... | G06F 21/602 |
| 2019/0384834 A1* | 12/2019 | Nelluri | ............... | G06F 16/1805 |

* cited by examiner

*Primary Examiner* — Matthew S Gart
*Assistant Examiner* — Liz P Nguyen
(74) *Attorney, Agent, or Firm* — GREENBERG TRAURIG LLP

(57) ABSTRACT

Systems and methods for tokenizing money market fund shares for use as collateral or in other transactions are disclosed. Methods may tokenize money market fund shares and using the tokens collateral without having to redeem the shares from the underlying money market fund. This may bring velocity to trapped assets, such as money market fund shares, which traditionally bring many challenges and cannot be used as collateral. The money market fund shares may be encumbered in underlying collateral transfer agency ledgers through use of an account structure where the money market fund shares may be moved from an account of the money market fund shares holder, through a pass-through account, and then to a tokenization account. Once the money market fund shares are moved to the tokenization account, the collateral provider cannot unilaterally access the money market fund shares. This ensures encumbrance.

10 Claims, 3 Drawing Sheets

SYSTEMS AND METHODS FOR TOKENIZING MONEY MARKET FUND SHARES FOR USE AS COLLATERAL OR IN OTHER TRANSACTIONS

RELATED APPLICATIONS

This application claims priority to, and the benefit of, U.S. Provisional Patent Application Ser. No. 63/122,852, filed Dec. 8, 2020, the disclosure of which is hereby incorporated, by reference, in its entirety.

BACKGROUND OF THE INVENTION

1. Field of the Invention

The present disclosure generally relates to systems and methods for tokenizing money market fund shares for use as collateral or in other transactions.

2. Description of the Related Art

Money market funds (MMF) are fixed income mutual funds that invest in debt securities characterized by short maturities and minimal credit risk. Money market funds are generally stable, liquid, and have short durations. Because they are highly liquid, investors usually cash out of these funds before using the underlying capital for other investment purposes.

SUMMARY OF THE INVENTION

Systems and methods for tokenizing money market fund shares for use as collateral or in other transactions are disclosed. According to one embodiment, a method for tokenizing money market fund shares may include: (1) receiving, at a collateral provider node in a distributed ledger network, instructions from a collateral provider to tokenize money market fund shares in a pass-thorough account maintained by a transfer agency system, wherein a consensus algorithm writes the instructions to a plurality of distributed ledgers in the distributed ledger network; (2) providing, by a collateral token agent node in the distributed ledger network, the instructions to a collateral token agent via an Application Programming Interface; (3) converting, by a computer program at the collateral token agent, the instructions to SWIFT instructions and providing the SWIFT instructions to the transfer agency system, wherein the transfer agency system is configured to move the money market fund shares from the pass-thorough account to a collateral token agent investor account also maintained by the transfer agency system, wherein the money market fund shares are unavailable for unilateral access by the collateral provider when in the collateral token agent investor account; (4) receiving, from the transfer agency system, a SWIFT confirmation message confirming that the SWIFT instructions have been executed; and (5) writing, by the computer program at the collateral token agent, authorization to create a token balance for the money market fund shares in the collateral token agent investor account, wherein a first smart contract in the distributed ledger network creates the token balance.

In one embodiment, the instructions to tokenize money market fund shares may be received from an application executed on an electronic device.

In one embodiment, the SWIFT instructions may include a MT542 message, and the SWIFT confirmation message may include a MT546 message.

In one embodiment, the method may further include writing, by the collateral provider, an instruction to pledge a pledge amount of the token balance as collateral to the distributed ledger network, wherein the instruction comprises the pledge amount of tokens and an identification of a collateral receiver; identifying, by a second smart contract in the distributed ledger network, the instruction to pledge the tokens as collateral; locking, by the second smart contract, the pledge amount so that the collateral provider and the collateral receiver cannot access the money market fund shares associated with the pledge amount; writing, by the second smart contract, the pledge amount of tokens as collateral on the distributed ledger network; and granting, by the second smart contract, access to the pledge amount to the collateral receiver.

In one embodiment, the method may further include writing, by the collateral provider, an instruction to transfer title to the token balance to a counterparty to the distributed ledger network; identifying, by a third smart contract in the distributed ledger network, the instruction to transfer title to the token balance as collateral; debiting, by the third smart contract, the token balance from the collateral provider; and crediting, by the third smart contract, the token balance to the counterparty.

According to another embodiment, a method for redeeming tokenized money market fund shares may include: (1) receiving, at a collateral provider node in a distributed ledger network, instructions from a collateral provider to redeem tokenized money market shares on a distributed ledger network, wherein a consensus algorithm writes the instructions to a plurality of distributed ledgers in the distributed ledger network; (2) providing, by a collateral token agent node in the distributed ledger network, the instructions to a collateral token agent via an Application Programming Interface; (3) converting, by a computer program at the collateral token agent, the instructions to SWIFT instructions and providing the SWIFT instructions to a transfer agency system, wherein the transfer agency system is configured to move money market fund shares for the tokenized money market shares from a collateral token agent investor account to a pass-through account maintained by the transfer agency system; (4) receiving, from the transfer agency system, a SWIFT confirmation message confirming that the SWIFT instructions have been executed; and (5) writing, by the computer program at the collateral token agent, authorization to reduce a token balance for the money market fund shares in the distributed ledger network, wherein a first smart contract in the distributed ledger network reduces the token balance.

In one embodiment, the instructions to redeem money market fund shares may be received from an application executed on an electronic device.

In one embodiment, the SWIFT instructions may include a MT542 message, and the SWIFT confirmation message may include a MT546 message.

According to another embodiment, a system may include a transfer agency system maintaining an investor main account, a pass-through account, and a collateral token agent investor account; a distributed ledger network comprising a collateral provider node and a collateral token agent node, wherein the collateral provider node and the collateral token agent node each comprise a user interface and a database maintaining a copy of a distributed ledger; a collateral token agent system in communication with the transfer agency system and the collateral token agent node; and a collateral provider system in communication with the transfer agency system and the collateral provider node. The collateral provider node may receive instructions from the collateral provider system to tokenize money market fund shares in the pass-thorough account and a consensus algorithm writes the instructions to the copies of the distributed ledger. The collateral provider node may provide the instructions to the collateral token agent system via an Application Programming Interface. A computer program at the collateral token agent system may convert the instructions to SWIFT instructions and provides the SWIFT instructions to the transfer agency system. The transfer agency system may move the money market fund shares from the pass-thorough account to the collateral token agent investor account, wherein the money market fund shares are unavailable for unilateral access by a collateral provider when in the collateral token agent investor account. The transfer agency system may receive a SWIFT confirmation message confirming that the SWIFT instructions have been executed. The computer program at the collateral token agent system may write authorization to create a token balance for the money market fund shares in the collateral token agent investor account. A first smart contract in the distributed ledger network may create the token balance on the distributed ledger network.

In one embodiment, the instructions to tokenize money market fund shares may be received from an application executed on an electronic device.

In one embodiment, the SWIFT instructions may include a MT542 message, and the SWIFT confirmation message may include a MT546 message.

In one embodiment, the collateral provider may write an instruction to pledge the tokens as collateral to the distributed ledger network, wherein the instruction comprises a pledge amount of tokens and an identification of a counterparty; a second smart contract in the distributed ledger network may identify the instruction to pledge the tokens as collateral, lock the pledge amount of tokens so that the collateral provider and the counterparty cannot access the money market fund shares associated with the pledged amount, write the pledged amount of the tokens as collateral on the distributed ledger network, and grant access to the pledged amount to the collateral receiver.

In one embodiment, the collateral provider may write an instruction to transfer title to a token amount of the tokens to a counterparty to the distributed ledger network; a third smart contract in the distributed ledger network may receive the instruction to transfer title to the tokens as collateral; the third smart contract may debit a token balance for the collateral provider by the token amount; and the third smart contract may credit a token balance for the counterparty by the token amount.

Embodiments may be directed to methods for tokenizing money market fund shares and using the tokens collateral without having to redeem the shares from the underlying money market fund. Embodiments may bring velocity to trapped assets, such as money market fund shares, which traditionally bring many challenges and cannot be used as collateral.

Embodiments may encumber the money market fund shares in underlying collateral transfer agency ledgers through use of an account structure where the money market fund shares may be moved from an account of the money market fund shares holder (e.g., the Collateral Provider) through a pass-through account, such as a pledgable account, and then to a tokenization account (e.g., an account in the name of the collateral token agent). Once the money market fund shares are moved to the account of the collateral token agent, the collateral provider cannot unilaterally access the money market fund shares. This ensures encumbrance.

Embodiments may leverage an integration between a blockchain-based tokenization application and a legacy transfer agency infrastructure. Embodiments may convert blockchain-based messages or instructions to SWIFT instructions, which ensures that legacy transfer agency systems can be instructed based on events triggered on the blockchain network. In embodiments, the legacy transfer agency systems are not required to change the manners in which they receive instructions. In this way, the system introduces a method to scale this offering to multiple transfer agents.

Embodiments may incorporate pledging and title transfer—which are key collateral transactions—to codified logic within smart contracts. This enables asset holders to create tokens representing money market fund shares and pledge/transfer title to those tokens to counterparties.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for tokenizing money market fund shares for use as collateral or in other transactions are disclosed.

In embodiments, money market fund shares may be digitized (e.g., one or more tokens may be generated for the money market fund shares) and may be used as collateral, in transactions (e.g., as collateral in bilateral derivative trades), etc. In embodiments, the underlying money market fund shares do not have to redeemed to be pledged as collateral or transferred to another party.

Figure 1:
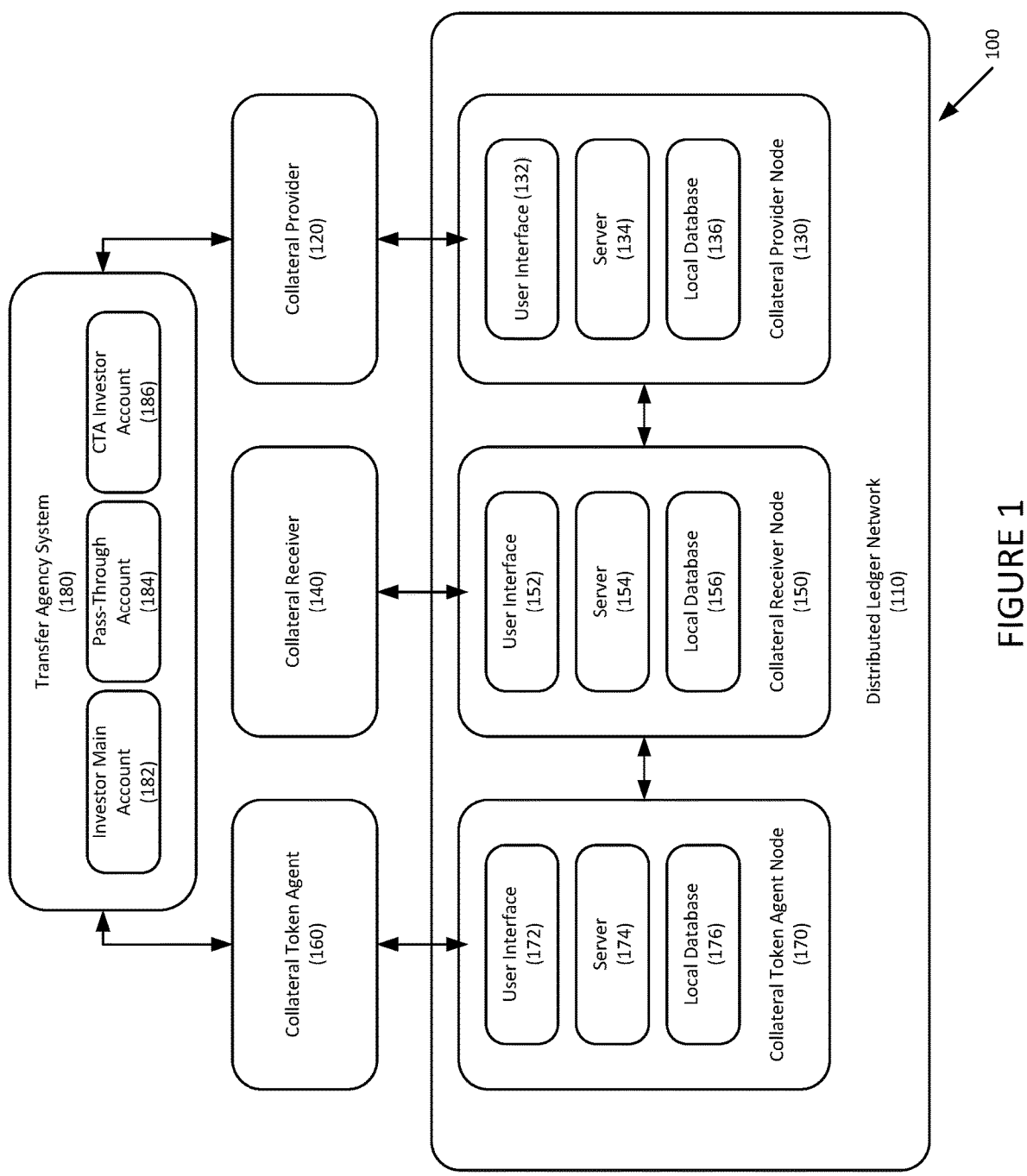
FIG. 1 depicts a system for tokenizing money market fund shares for use as collateral or in other transactions according to an embodiment.

Referring to FIG. 1, a system for using tokenized money market fund shares as collateral margin is disclosed according to an embodiment. System 100 may include distributed ledger network 110, which may be a blockchain-based network. Distributed ledger network 110 may include a plurality of nodes, including collateral provider node 130 associated with collateral provider 120, collateral receiver node 150 associated with collateral receiver 140, and collateral token agent node 170 associated with collateral token agent 160. In embodiments, a consensus algorithm operating on nodes 130, 150, 170 may update a distributed ledger in which multiple copies of the distributed ledger exist across nodes 130, 150, 170. Information may be added to a block in the blockchain-based system according to the consensus algorithm.

Each node 130, 150, 170 may include a user interface (e.g., 132, 152, 172), a server or computing device (e.g., 134, 154, 174) that hosts the node, and a local database (e.g., 136,

156, 176). User interface 132, 152, 154 may be any suitable user interface through which a user may access the node, including browsers, applications, etc. Local databases 136, 156, 176 may host copies of the distributed ledger.

Distributed ledger network 110 may include one or more smart contracts that may create, pledge, transfer title, and/or redeem tokens on the distributed ledger. Pledge functionalities may include requesting tokens, submitting a new pledge, increasing or reducing an existing pledge, and redeeming tokens. Title transfer functionalities may include requesting tokens, transferring title, reusing tokens, recalling tokens, and redeeming tokens.

Examples of creating and minting tokens are disclosed in U.S. Provisional Patent Application Ser. No. 62/757,614, filed Nov. 8, 2018, and U.S. patent application Ser. No. 16/677,609, filed Nov. 7, 2019, the disclosure so which are hereby incorporated, by reference, in their entireties.

Collateral provider 120 may be a source of money market fund shares, such as an investor. Collateral provider 120 may interface with user interface 132, and may further interface transfer agency system 180.

Collateral receiver 140 may be the counterparty to a pledge or title transfer transaction.

Collateral token agent 160 may be a trusted third party system that may authorize the creation or reduction of token balances representing money market fund shares. Collateral token agent 160 may interface with collateral token agent node 170 via one or more Application Programming Interfaces (APIs). Collateral token agent 160 may further include a connectivity service (not shown) that may convert instructions from collateral token agent node 170 to Society for Worldwide Interbank Financial Telecommunications "SWIFT") instructions, and vice-versa.

Transfer agency system 180 may encumber money market funds using an account structure. For example, transfer agency system 180 may maintain an account structure including investor main account 182, pass-thorough account 184, such as an investor pledge account, and collateral token agent (CTA) investor account 186. Investor main account 182 and pass-thorough account 184 may be owned by the investor, and CTA investor account 146 may be owned by collateral token agent 160. The beneficial owner of CTA investor account 146 is the holder of the token(s) as evidenced by distributed ledger network 122.

Transfer agency system 180 may transfer funds among accounts 182, 184, 186 in response to a communication from collateral token agent 160.

In embodiments collateral token agent 160 may ensure that the total balance of money market fund shares in CTA investor account 186 and the total outstanding token balance on the network is always equal.

Figure 2:
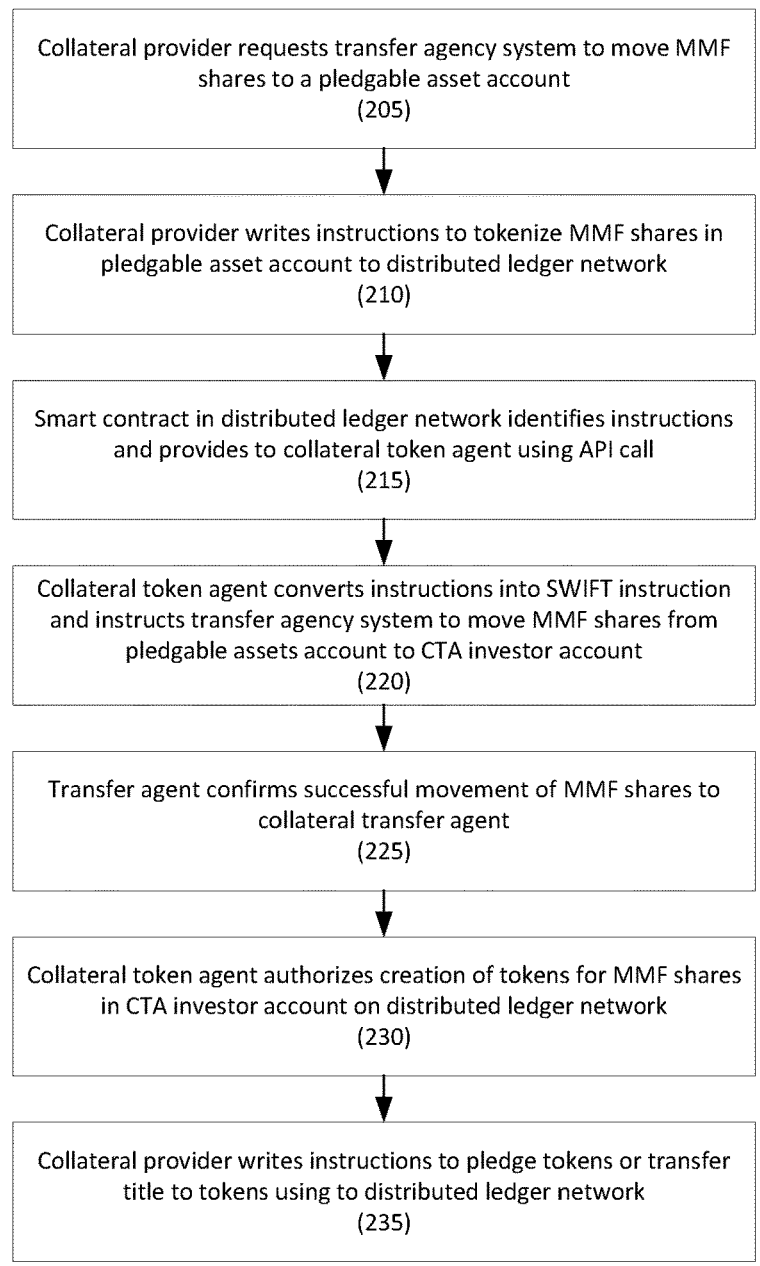
FIG. 2 depicts a method for tokenizing money market fund shares as collateral margin according to an embodiment.

Referring to FIG. 2, a method for tokenizing money market fund shares as collateral margin is disclosed according to an embodiment.

In step 205, a collateral provider, such as an investor, may move money market funds from an investor main account to a pass-through account, such as a pledgable asset account, with, for example, a transfer agency system that may maintain the accounts. In one embodiment, the collateral provider may provide instructions to the transfer agency system using a computer program, such as an application, a browser, etc.

In step 210, the collateral provider may provide tokenization instructions for the money market fund shares that have been transferred to the pass-thorough account. In one embodiment, the collateral provider may provider the instructions to its node using a user interface, such as an application, a browser, etc. The instructions may then be provided to the distributed ledger.

In step 215, the tokenization instructions may be directed to the collateral token agent node, which may provide the instructions to the collateral token agent via an API call. For example, the collateral token node may receive the instructions because they are written to the distributed ledger, and an API call may be used to communicate the instructions from the collateral token agent node to the collateral token agent system.

In step 220, a computer program at the collateral token agent may convert the instructions from the collateral tokenization application backend into SWIFT instructions (e.g., one or more MT542 messages), and may communicate the SWIFT instructions to the transfer agency system. For example, the instructions may be to move the money market fund shares from the pass-thorough account to a tokenization account, such as a CTA investor account.

In step 225, the transfer agency system may execute the move, and may confirm the successful movement of the MMF shares to the collateral token agent investor account by, for example a SWIFT confirmation message (e.g., a MT546 message) to the collateral token agent. In one embodiment, once moved to the collateral token agent investor account, the funds are encumbered or ringfenced so that the collateral provider cannot unilaterally access them.

In step 230, after receiving the confirmation message, the computer program at the collateral token agent may authorize the creation of token balance equivalent to the balance of shares in the CTA investor account. For example, a smart contract in the distributed ledger network may create the token balance, and may write the token balance to the distributed ledger network.

In step 235, the collateral provider may pledge title or transfer title to the tokens using a computer program or application. For example, the collateral provider may write instructions to the distributed ledger network to pledge the tokens as collateral or transfer title to the tokens, and a smart contract may pledge the token(s) or transfer title to the token(s) as requested.

The smart contracts may include logic for pledging and transferring title to the tokens. For example, each smart contract may be called with details of asset, amount of asset and an identifier for the counterparty to the transaction. When called, the pledge smart contract locks the "pledged balance" such that neither party (e.g., the collateral provider or the collateral receiver) can use the pledged tokens while a pledge is in progress. When called, the title transfer smart contract may debit the token balance from the collateral provider and credits the token balance to the collateral receiver.

In one embodiment, the smart contract may write the pledge or transfer to the distributed ledger network.

Figure 3:
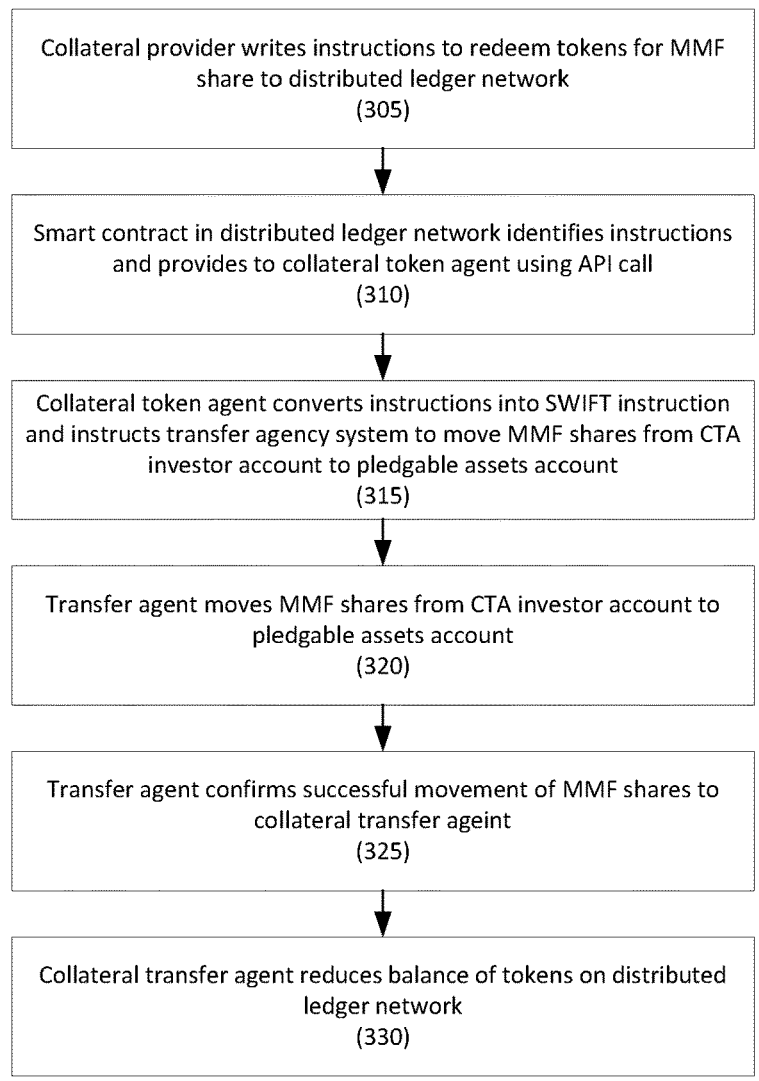
FIG. 3 depicts a method for redeeming tokenized money market fund shares according to an embodiment.

FIG. 3 depicts a method for redeeming tokenized money market fund shares according to an embodiment.

In step 305, the collateral provider, such as an investor, may request redemption of MMF tokens. In one embodiment, the collateral provider may request redemption using a computer program or application. The collateral provider may write the instructions to its node in a distributed ledger network.

In step 310, the redemption instructions may be directed to the collateral token agent node, which may provide the instructions to the collateral token agent via an API call.

In step 315, a computer program at the collateral token agent may convert the instructions from the collateral tokenization application backend into SWIFT instructions (e.g., one or more MT542 messages), and may communicate the SWIFT instructions to the transfer agency system. For example, the instructions may be to move the money market fund shares from a tokenization account, such as a CTA investor account, to a pass-thorough account.

In step 320, the transfer agency system may execute the move, and, in step 325, may confirm the successful movement of the MMF shares to the collateral token agent using, for example, a SWIFT confirmation message (e.g., a MT546 message). In one embodiment, once moved to the pass-thorough account, the funds are unencumbered and the collateral provider may access the fund units from the pass-thorough account and move it to the main account as necessary.

In step 330, the computer program at the collateral token agent may call a smart contract to reduce the balance of tokens on the distributed ledger network. The collateral provider may then access the funds, and may move them to the investor main account if desired.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, at a collateral provider node in a distributed ledger network comprising a plurality of nodes, blockchain-based tokenization instructions from a collateral provider to tokenize money market fund shares in a pass-thorough account maintained by a transfer agency system, wherein a consensus algorithm writes the blockchain-based tokenization instructions to a plurality of distributed ledgers in the distributed ledger network so that the blockchain-based tokenization instructions are immutable;

providing, by a collateral token agent node of the plurality of nodes in the distributed ledger network, the blockchain-based tokenization instructions to a collateral token agent via an Application Programming Interface;

converting, by a computer program at the collateral token agent and by using a connectivity service, the blockchain-based tokenization instructions to society for worldwide interbank financial telecommunications ("SWIFT") tokenization instructions that are executable by the transfer agency system;

providing, by a computer program at the collateral token agent, the SWIFT tokenization instructions to the transfer agency system that is not a participant of the distributed ledger network;

moving, by the transfer agency system, the money market fund shares from the pass-thorough account to a collateral token agent investor account also maintained by the transfer agency system, wherein the money market fund shares are unavailable for unilateral access by the collateral provider when in the collateral token agent investor account;

receiving, from the transfer agency system, a SWIFT tokenization confirmation message confirming that the SWIFT tokenization instructions have been executed;

generating, by the computer program at the collateral token agent, blockchain-based tokenization instructions to create a number of tokens equivalent to the money market fund shares to create a token balance for the money market fund shares in the collateral token agent investor account, wherein a first smart contract in the distributed ledger network executes the blockchain-based tokenization instructions and creates the token balance;

writing, by the collateral provider, a blockchain-based pledge instruction to pledge a pledge amount of the token balance as collateral to the distributed ledger network, wherein the blockchain-based pledge instruction comprises the pledge amount of tokens and an identification of a collateral receiver, wherein the collateral provider and the collateral receiver cannot use the pledge amount of tokens while the pledge is in progress;

identifying, by a second smart contract in the distributed ledger network, the blockchain-based pledge instruction to pledge the tokens as collateral;

locking, by the second smart contract, the pledge amount so that the collateral provider and the collateral receiver cannot access the money market fund shares associated with the pledge amount;

writing, by the second smart contract, the pledge amount of tokens as collateral on the distributed ledger network;

granting, by the second smart contract, access to the pledge amount to the collateral receiver;

receiving, at the collateral provider node, blockchain-based redemption instructions from the collateral provider to redeem the token balance for the money market fund shares on the distributed ledger network;

providing, by the collateral token agent node, the blockchain-based redemption instructions to the collateral token agent via the Application Programming Interface;

converting, by the computer program at the collateral token agent, the blockchain-based redemption instructions to SWIFT redemption instructions and providing the SWIFT redemption instructions to the transfer agency system, wherein the transfer agency system is configured to move money market fund shares for the tokenized money market shares from the collateral token agent investor account to the pass-through account;

receiving, by the computer program at the collateral token agent, a SWIFT redemption confirmation message confirming that the SWIFT redemption instructions have been executed; and writing, by the computer program at the collateral token agent, authorization to reduce a token balance for the money market fund shares in the distributed ledger network, wherein a third smart contract in the distributed ledger network reduces the token balance;

wherein the computer program at the collateral token agent ensures that a total balance of the money market fund shares in the collateral token agent investor account and the token balance is always equal.

2. The method of claim 1, wherein the blockchain-based tokenization instructions to tokenize money market fund shares are received from an application executed on an electronic device.

3. The method of claim 1, wherein the SWIFT tokenization instructions comprise a MT542 message.

4. The method of claim 1, wherein the SWIFT tokenization confirmation message comprises a MT546 message.

5. The method of claim 1, further comprising:
writing, by the collateral provider, a transfer instruction to transfer title to the token balance to a counterparty to the distributed ledger network;
identifying, by a fourth smart contract in the distributed ledger network, the transfer instruction to transfer title to the token balance as collateral;
debiting, by the fourth smart contract, the token balance from the collateral provider; and
crediting, by the fourth smart contract, the token balance to the counterparty.

6. A system, comprising:
a transfer agency system maintaining an investor main account, a pass-through account, and a collateral token agent investor account;
a distributed ledger network comprising a plurality of nodes including a collateral provider node and a collateral token agent node, wherein the collateral provider node and the collateral token agent node each comprise a user interface and a database maintaining a copy of a distributed ledger;
a collateral token agent system in communication with the transfer agency system and the collateral token agent node; and
a collateral provider system in communication with the transfer agency system and the collateral provider node;
wherein:
the collateral provider node receives blockchain-based tokenization instructions from the collateral provider system to tokenize money market fund shares in the pass-thorough account, wherein a consensus algorithm writes the blockchain-based tokenization instructions to the copies of the distributed ledger;
the collateral token agent node provides the blockchain-based tokenization instructions to the collateral token agent system via an Application Programming Interface;
a computer program at the collateral token agent system uses a connectivity service to convert the blockchain-based tokenization instructions to society for worldwide interbank financial telecommunications ("SWIFT") tokenization instructions that are executable by the transfer agency system and provides the SWIFT tokenization instructions to the transfer agency system that is not a participant of the distributed ledger network;
the transfer agency system moves the money market fund shares from the pass-thorough account to the collateral token agent investor account, wherein the money market fund shares are unavailable for unilateral access by a collateral provider when in the collateral token agent investor account;
the transfer agency system receives a SWIFT tokenization confirmation message confirming that the SWIFT tokenization instructions have been executed;
the computer program at the collateral token agent system generates blockchain-based tokenization instructions to create a number of tokens equivalent to the money market fund shares to create a token balance for the money market fund shares in the collateral token agent investor account; and a first smart contract in the distributed ledger network executes the blockchain-based tokenization instructions and creates the token balance on the distributed ledger network;

the collateral provider writes a blockchain-based pledge instruction to pledge the tokens as collateral to the distributed ledger network, wherein the blockchain-based pledge instruction comprises a pledge amount of tokens and an identification of a counterparty, and wherein the collateral provider and the collateral receiver cannot use the pledge amount of tokens while the pledge is in progress;

a second smart contract in the distributed ledger network identifies the blockchain-based pledge instruction to pledge the tokens as collateral, locks the pledge amount of tokens so that the collateral provider and the counterparty cannot access the money market fund shares associated with the pledged amount, writes the pledged amount of the tokens as collateral on the distributed ledger network, and grants access to the pledged amount to the collateral receiver;

the collateral provider node receives blockchain-based redemption instructions from the collateral provider to redeem the token balance for the money market fund shares on the distributed ledger network;

the collateral token agent node provides the blockchain-based redemption instructions to the collateral token agent via the Application Programming Interface;

the computer program at the collateral token agent converts the blockchain-based redemption instructions to SWIFT redemption instructions and providing the SWIFT redemption instructions to the transfer agency system, wherein the transfer agency system is configured to move money market fund shares for the tokenized money market shares from the collateral token agent investor account to the pass-through account;

computer program at the collateral token agent receives a SWIFT redemption confirmation message confirming that the SWIFT redemption instructions have been executed; and the computer program at the collateral token agent writes authorization to reduce a token balance for the money market fund shares in the distributed ledger network, wherein a third smart contract in the distributed ledger network reduces the token balance;

wherein the computer program at the collateral token agent ensures that a total balance of the money market fund shares in the collateral token agent investor account and the token balance is always equal.

7. The system of claim 6, wherein the blockchain-based tokenization instructions to tokenize money market fund shares are received from an application executed on an electronic device.

8. The system of claim 6, wherein the SWIFT tokenization instructions comprise a MT542 message.

9. The system of claim 6, wherein the SWIFT tokenization confirmation message comprises a MT546 message.

10. The system of claim 6, wherein:

the collateral provider writes a transfer instruction to transfer title to a token amount of the tokens to a counterparty to the distributed ledger network;

a third smart contract in the distributed ledger network receives the transfer instruction to transfer title to the tokens as collateral;

the third smart contract debits a token balance for the collateral provider by the token amount; and the third smart contract credits a token balance for the counterparty by the token amount.

* * * * *